(12) United States Patent
Clerk et al.

(10) Patent No.: US 11,174,162 B2
(45) Date of Patent: Nov. 16, 2021

(54) TECHNOLOGIES FOR QUANTUM SENSING

(71) Applicant: THE UNIVERSITY OF CHICAGO, Chicago, IL (US)

(72) Inventors: Aashish Clerk, Chicago, IL (US); Hoi-Kwan Lau, Chicago, IL (US)

(73) Assignee: THE UNIVERSITY OF CHICAGO, Chicago, IL (US)

( * ) Notice: Subject to any disclaimer, the term of this patent is extended or adjusted under 35 U.S.C. 154(b) by 0 days.

(21) Appl. No.: 17/056,599

(22) PCT Filed: May 30, 2019

(86) PCT No.: PCT/US2019/034527
§ 371 (c)(1),
(2) Date: Nov. 18, 2020

(87) PCT Pub. No.: WO2019/232133
PCT Pub. Date: Dec. 5, 2019

(65) Prior Publication Data
US 2021/0206631 A1    Jul. 8, 2021

Related U.S. Application Data

(60) Provisional application No. 62/677,844, filed on May 30, 2018.

(51) Int. Cl.
*B82Y 15/00* (2011.01)
*H01P 1/38* (2006.01)
*H01P 7/06* (2006.01)

(52) U.S. Cl.
CPC ............... *B82Y 15/00* (2013.01); *H01P 1/38* (2013.01); *H01P 7/06* (2013.01)

(58) Field of Classification Search
CPC . B82Y 15/00; H01P 1/38; H01P 1/383; H01P 1/387; H01P 1/32; H01P 1/36; H01P 7/06
USPC ......................................... 333/219, 1.1, 24.2
See application file for complete search history.

(56) References Cited

U.S. PATENT DOCUMENTS

| | | | |
|---|---|---|---|
| 7,457,651 B2 | 11/2008 | Accatino et al. | |
| 8,670,476 B2 | 3/2014 | Goddard et al. | |
| 2006/0227331 A1* | 10/2006 | Vollmer | ................. G01N 21/39 356/483 |
| 2009/0310140 A1 | 1/2009 | Abdallah et al. | |

OTHER PUBLICATIONS

PCT Search Report and Written Opinion prepared for PCT/US2019/034527, completed Jul. 30, 2019.

* cited by examiner

*Primary Examiner* — Stephen E. Jones
(74) *Attorney, Agent, or Firm* — Barnes & Thornburg LLP

(57) ABSTRACT

Technologies for quantum sensing are disclosed. In the illustrative embodiment, a sensor system may be operated by coupling an electromagnetic wave from a measurement line to a first resonator. The sensor system includes a second resonator that is non-reciprocally coupled to the first resonator. In the absence or a perturbation, there is no reciprocal coupling between the first resonator and the second resonator, but a perturbation may cause reciprocal coupling between the first and second resonator. With appropriate selection of the non-reciprocal coupling, the signal at the output of the measurement line may allow for fast determination of whether the perturbation is present.

20 Claims, 4 Drawing Sheets

TECHNOLOGIES FOR QUANTUM SENSING

CROSS-REFERENCE TO RELATED APPLICATIONS

The present application is a national stage entry under 35 U.S.C. § 371(b) of PCT International Application No. PCT/US2019/034527, filed May 30, 2019, which claims the benefit of U.S. provisional patent application No. 62/677,844, filed on May 30, 2018, and entitled "Sensor," the entirety of both of which are hereby incorporated by reference.

BACKGROUND

Electromagnetic waves such as light or microwaves are often used for sensitive measurements, such as measuring the presence of biological molecules in the presence of a resonator or measuring the presence of a gravitational wave. Those measurements are often limited by the amount of power that can be present in the electromagnetic wave.

Recently, variations of those systems have been investigated as a possible approach for improving the sensitivity of certain measurements with electromagnetic waves without increasing the amount of power in the electromagnetic waves. In particular, an electromagnetic system at an exceptional point (i.e., a point where the loss and gain are balanced) may have a square-root dependence on small perturbations to certain parameters, indicating that a large signal may be detectable based on a small perturbation of those parameters.

SUMMARY

According to one aspect of the disclosure, a sensor system for sensing a perturbative coupling is disclosed. The sensor system includes a first resonator supporting a first electromagnetic mode and a second resonator supporting a second electromagnetic mode, wherein the second electromagnetic mode is non-reciprocally coupled to the first electromagnetic mode such that the second electromagnetic mode can influence the first electromagnetic mode without a corresponding influence from the first electromagnetic mode on the second electromagnetic mode. The sensor system further includes a measurement line coupled to the first resonator for driving the first electromagnetic mode and providing a readout signal, wherein the first resonator and the second resonator are configured such that a perturbative coupling can cause reciprocal coupling between the first electromagnetic mode and the second electromagnetic mode. The readout signal of the measurement line is indicative of the whether the perturbative coupling is present.

In some embodiments, the sensor system may have no reciprocal coupling between the first electromagnetic mode and the second electromagnetic mode in the absence of the perturbative coupling.

In some embodiments, the second electromagnetic mode may be non-reciprocally transferred to the first electromagnetic mode at a rate J, wherein the magnitude of J is greater than $\sqrt{v_2^2+\gamma_2^2/4}$, where $v_2$ is a detuning of a frequency of the second electromagnetic mode relative to a frequency of the first electromagnetic mode and $\gamma_2$ is a rate of damping or anti-damping of the second electromagnetic mode.

In some embodiments, the sensor system may have a magnitude of the non-reciprocal coupling between the first electromagnetic mode and the second electromagnetic mode J of at least ten times $\sqrt{v_2^2+\gamma_2^2/4}$.

In some embodiments, the sensor system may have a readout signal that is indicative of whether a perturbative coupling of strength e is present in less time man $$\frac{k}{16\varepsilon^2\bar{n}},$$

wherein k is a coupling rate of the measurement line and the first resonator and $\bar{n}$ is the average number of photons in the first resonator.

In some embodiments, the first resonator may have a loss rate of $k+\gamma_1$ and the second resonator may have a loss rate of $\gamma_2$, wherein k is a coupling rate of the measurement line and the first resonator, wherein $\gamma_2 < \frac{1}{4}\gamma_1$.

In some embodiments, each of the first resonator and the second resonator is an optical cavity.

In some embodiments, the first and second resonators are each coupled to a waveguide by a corresponding circulator, the first resonator being thereby coupled to the second resonator non-reciprocally.

In some embodiments, the first and second resonators are each coupled to an edge state of a topological photonic system, the first resonator being thereby coupled to the second resonator non-reciprocally.

In some embodiments, the first and second resonators are non-reciprocally coupled by methods using dynamic modulation.

In some embodiments, each of the first and second resonators is a microwave cavity.

In some embodiments, each of the first and second resonators is a resonant mode of a superconducting quantum circuit.

In some embodiments, the sensor system further includes a perturbative element causing the perturbative coupling, wherein the perturbative element is one or more biological molecules or one or more nanoparticles.

In some embodiments, the perturbative coupling is present and the perturbative coupling is caused by a gravitational wave, wherein the readout signal is indicative of whether the gravitational wave is present.

In some embodiments, the perturbative coupling is present and the perturbative coupling is caused by a rotation of at least one of the first resonator or the second resonator, wherein the readout signal is indicative of the rotation of the at least one of the first resonator or the second resonator.

In some embodiments, the first resonator and the second resonator are not at an exceptional point.

In some embodiments, the first resonator is not coupled to a source of coherent gain.

According to another aspect of the present disclosure, a method for sensing a perturbative coupling is disclosed. The method includes coupling an electromagnetic wave to a measurement line and coupling the electromagnetic wave to a first resonator, wherein the first resonator supports a first electromagnetic mode. If the perturbative coupling is present, the method includes coupling the electromagnetic wave to a second resonator, wherein the second resonator supports a second electromagnetic mode. The method further includes non-reciprocally coupling the second electromagnetic mode to the first electromagnetic mode. The method also includes measuring a readout signal of the measurement line and determining whether the perturbative coupling is present based on the readout signal of the measurement line.

In some embodiments, the second electromagnetic mode is non-reciprocally coupled to the first electromagnetic mode at a rate J, wherein the magnitude of J is greater than $\sqrt{v_2^2+\gamma_2^2/4}$, where $v_2$ is a detuning of a frequency of the second electromagnetic mode relative to a frequency of the first electromagnetic mode and $\gamma_2$ is a rate of damping or anti-damping of the second electromagnetic mode.

In some embodiments, the readout signal is indicative of whether a perturbative coupling of strength e is present in less time than $$\frac{k}{16\varepsilon^2 \bar{n}},$$

wherein k is a coupling rate of the measurement line and the first resonator and $\bar{n}$ is the average number of photons in the first resonator.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
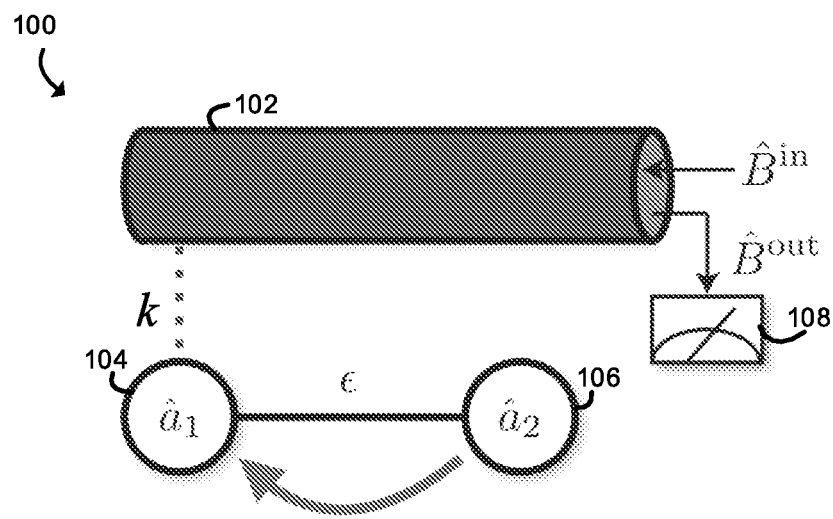
FIG. 1 is a simplified diagram of at least one embodiment of a sensor system with two resonators having non-reciprocal coupling.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a sensor system 100 may include a measurement line 102, a first resonator 104, a second resonator 106, and a measurement device 108 measuring the output of the measurement line 102. In use, the sensor system 100 is configured to measure small changes in a perturbative reciprocal coupling ε between a mode in the first resonator 104 and another mode in the second resonator 106. The illustrative sensor system 100 operates by sending light into the measurement line 102, where the mode of the measurement line 102 is coupled to a mode in the first resonator 104 at a rate k. The first and/or second resonator could be coupled to a gain element, leading to anti-damping. Absent a perturbation, the first resonator 104 has a non-reciprocal coupling to the second resonator 106, meaning that light can travel from the second resonator to the first (at a rate J, indicated by an arrow in the figure) but cannot travel from the first resonator 104 to the second resonator 106. If a perturbation is now present, it reciprocally couples the first resonator 104 and the second resonator 106 at a rate ε. The presence of the perturbation may be detected by measuring the output of the measurement line 102, such as by using homodyne detection. In particular, as will be shown in more detail below, when the magnitude of J is much greater than $\sqrt{v_2^2+\gamma_2^2/4}$, where $v_2$ is a detuning of a frequency of the second electromagnetic mode relative to a frequency of the first electromagnetic mode and $\gamma_2$ is a rate of damping or anti-damping (i.e., gain) of the mode of the second resonator 106, the presence of the perturbation may be detected faster than it could be for any reciprocal system.

The measurement line 102 may be any suitable measurement line, such as a waveguide, a fiber, a free-space mode (e.g., that may be coupled to the resonator 104 through a prism or beam-splitter), a transmission line, a microwave circuit, etc. Similarly, the resonators 104, 106 may be any suitable resonator, such as a whispering-gallery resonator, a Fabry-Perot interferometer, a superconducting resonator, an acoustic resonator, etc. In some embodiments, the first resonator 104 may be a different type of resonator than the second resonator 106. Additionally or alternatively, in some embodiments, the first resonator 104 and the second resonator 106 may be the same resonator with more than one mode. The non-reciprocal coupling from the second resonator 106 to the first resonator 104 may be based on any suitable type of non-reciprocal coupling, such as a chiral waveguide, a circulator, an isolator, an optomechanical system, a classical microwave circuit, a superconducting microwave circuit, coupling to an edge state of a topological photonic system, use of dynamic modulation, etc. The measurement device 108 may be any suitable measurement device. In the illustrative embodiment, the measurement device 108 performs homodyne detection on the output light coming out of the measurement line 102. Additionally or alternatively, the measurement device 108 may measure the output of the measurement line 102 in a different manner, such as using heterodyne detection, photon counting, power measurement, etc. The perturbative coupling that reciprocally couples the electromagnetic wave between the first resonator 104 and the second resonator 106 may be any suitable perturbation, such as a biological molecule, nanoparticles, motion of part or all of the sensor system 100 induced by an external force, coupling due to a gravitational wave, etc. In particular, in some embodiments, the two modes being coupled may be coupled by a rotation, allowing that rotation to be sensed at the measurement device 108. The perturbation may be relatively small or may be relatively large.

The Hamiltonian of the coupled resonators 104, 106 (with the perturbation ε=0) is $$H = \begin{bmatrix} -i\frac{k+\gamma_1}{2} & J \\ 0 & v_2 - i\frac{\gamma_2}{2} \end{bmatrix}.$$

The terms of the corresponding susceptibility matrix can be calculated as $$x_{11} = \frac{2k}{k+\gamma_1}, x_{21} = 0, \text{ and } x_{12} = -x_{11}\frac{J}{v_2 - i\gamma_2/2}.$$

Analysis of the system will show that the homodyne current measured at the measurement device 108 will be $$s = \frac{1}{16}\frac{|x_{11}||x_{12}+x_{21}|^2}{|x_{11}|^2+|x_{21}|^2}S_\varepsilon,$$

where $S_\varepsilon = 8\varepsilon^2\tau^2\bar{n}_{tot}$, which is the power associated with a standard single-mode dispersive measurement with perturbation ε, and $\bar{n}_{tot}$ is the average number of photons in the first resonator. The signal-to-noise ratio of the change of the homodyne measurement due to ε is equal to $2k\varepsilon^2\tau^2\lambda^2/\bar{S}_{11}$ where λ is a linear response coefficient, τ is time, and $\bar{S}_{11}$ is the shot noise in the homodyne current equal to k/2 in the absence of gain. The signal-to-noise ratio is defined to be $$\frac{\varepsilon^2}{k^2}\tau\Gamma_{meas},$$

where $\Gamma_{meas}$ is a measurement rate and $$\left(\frac{k}{\varepsilon_0}\right)^2 / \Gamma_{meas}$$

is the amount of time required to distinguish ε=ε₀ from ε=0. Plugging in $x_{21}=0$ gives a signal at the homodyne detection of $S=\frac{1}{16}S_\varepsilon|x_{12}|^2$ and a corresponding measurement rate of $\Gamma_{meas} = k\bar{n}_{tot}|x_{12}|^2$. It should be appreciated that the measurement rate can be increased by increasing $|x_{12}|^2$ without increasing the average number of photons in the first resonator. For example, if $|J|\gg\sqrt{v_2^2+\gamma_2^2/4}$, there will be a large enhancement of the measurement rate.

Figure 2:
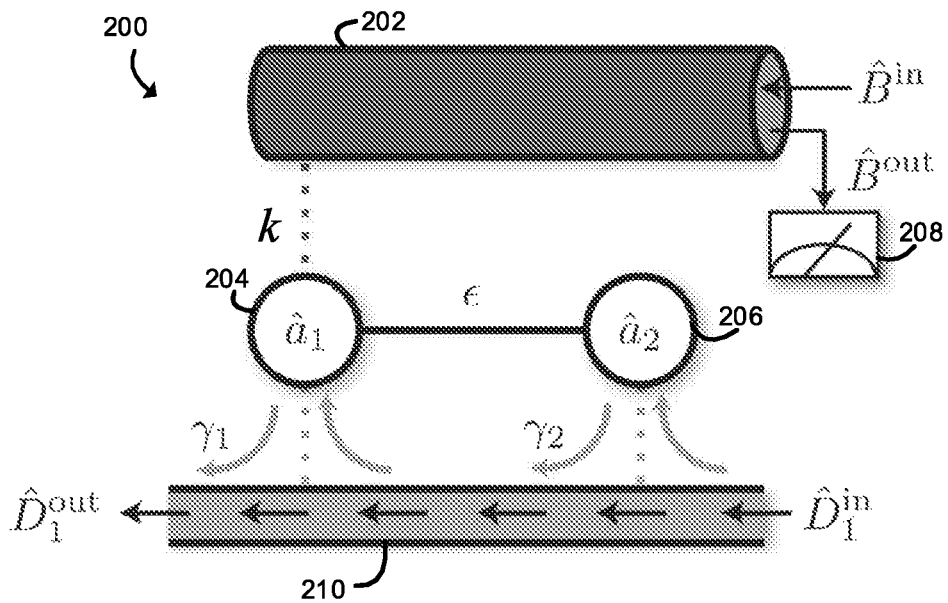
FIG. 2 is a simplified block diagram of at least one embodiment of a sensor system with two resonators having non-reciprocal coupling by a waveguide.

Referring now to FIG. 2, one embodiment of a sensor system 200 that is similar to the sensor system 100 is shown. The sensor system 200 includes a measurement line 202, a first resonator 204, a second resonator 206, and a measurement device 208. The non-reciprocal coupling between the second resonator 206 and the first resonator 204 is implemented with use of a chiral waveguide 210. Of course, it should be appreciated that, in other embodiments, non-reciprocal coupling may be implemented differently, such as by using isolators or circulators or coupling to an edge state of a topological photonic system, use of dynamic modulation, etc. Like the sensor system 100, the light in the measurement line 202 is coupled to a mode in the first resonator 204 at a rate k. The first resonator 204 has an additional damping $\gamma_1$, which, in the illustrative embodiment, is completely due to coupling to the chiral waveguide 210. Similarly, the second resonator 206 has a damping of $\gamma_2$ due to coupling to the chiral waveguide 210. The second resonator 206 may be detuned from the first resonator 204 by an amount $v_2$. The second resonator 206 is non-reciprocally coupled to the first resonator 204 through the chiral waveguide 210 at a rate J. The two modes can be coupled by a perturbation ε.

As shown above in regard to FIG. 1, the terms of the corresponding susceptibility matrix can be calculated as $$x_{11} = \frac{2k}{k+\gamma_1}, x_{21} = 0, \text{ and } x_{12} = -x_{11}\frac{J}{v_2 - i\gamma_2/2}.$$

and the corresponding measurement rate is $\Gamma_{meas}=k\bar{n}_{tot}|x_{12}|^2$. Accordingly, the measurement rate of the sensor system 200 can be increased by increasing $|x_{12}|^2$ without increasing the average number of photons in the first resonator. As stated above, if $|J|\gg\sqrt{v_2^2+\gamma_2^2/4}$, there will be a large enhancement of the measurement rate. In one embodiment of the sensor system 200, if J is set to be equal to $-i\sqrt{\gamma_1\gamma_2}$, then the measurement rate for the system will be $$4k\bar{n}_{tot}\left(\frac{\gamma_1}{\gamma_2}\right),$$

showing that a large enhancement can be had by tuning the coupling of the resonators 204, 206 to the chiral waveguide 210.

Figure 3:
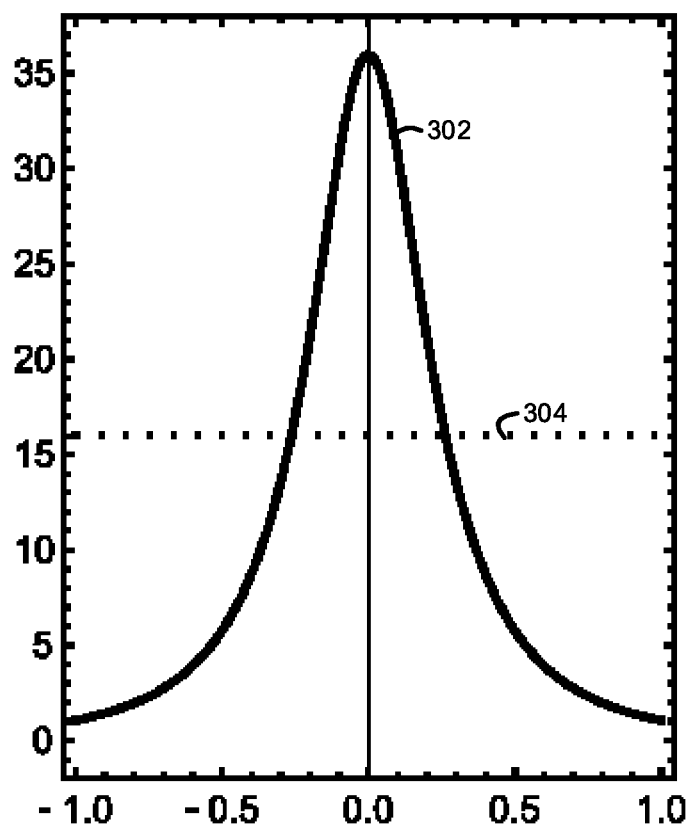
FIG. 3 is a graph of a measurement rate of a parameter of the sensor system of FIG. 2.

Referring now to FIG. 3, the measurement rate $\Gamma_{meas}$ is plotted against a cavity detuning relative to the coupling rate k as solid line 302, while dot 04 is the limit for the measurement rate of a reciprocal system. The plot shown is for $\gamma_1=k$, $\gamma_2=0.5k$, J=1.5k, $v_2=0$. As shown, the measurement rate $\Gamma_{meas}$ for a non-reciprocal system can be significantly higher than for a reciprocal system.

Figure 4:
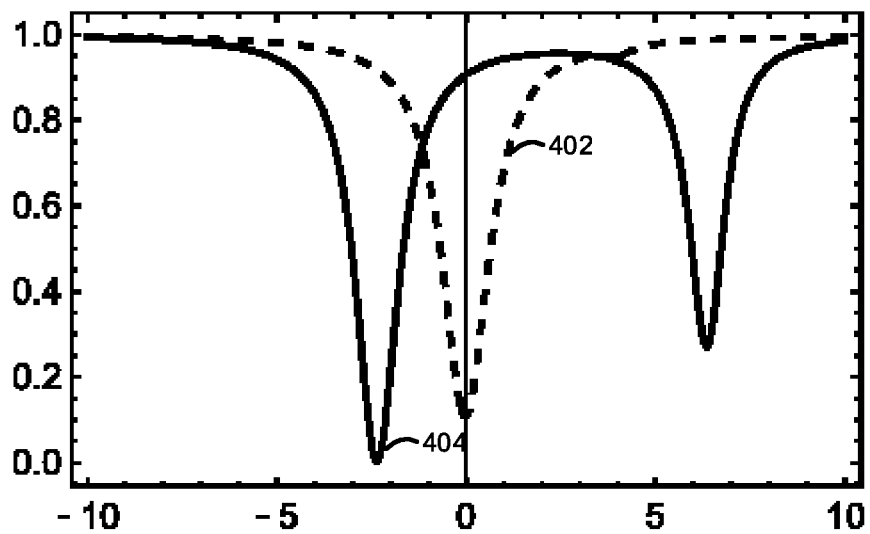
FIG. 4 is a graph of signal power as a function of frequency, showing a shift in a resonance of a mode of the sensor system of FIG. 2.

Referring now to FIG. 4, it should be appreciated that the sensor systems disclosed herein with non-reciprocal coupling are not limited to detecting small perturbations abut can also be used in systems that have large perturbations. For example, in some embodiments, such as embodiments with gain, perturbations may be large enough to shift the resonance peak of the system, as shown in FIG. 4. Dashed line 402 shows the response of the homodyne detection with a strong perturbation and no non-reciprocal coupling (ε=0.3k, J=0), and solid line 404 shows the response of the homodyne detection with a strong perturbation and non-reciprocal coupling (ε=0.3k, J=50k). Not only is the peak shifted, but a second peak is apparent as well, which is due to coupling between the resonators.

Figure 5:
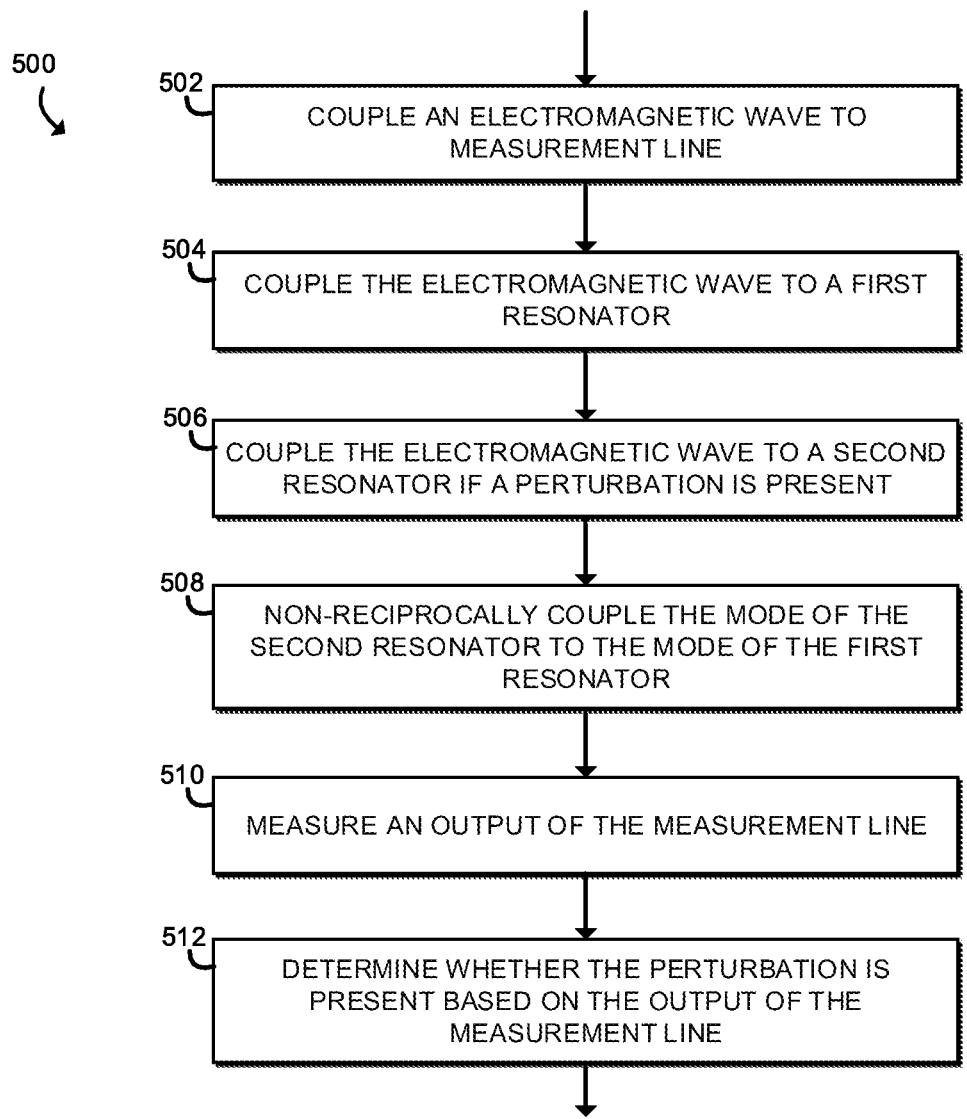
FIG. 5 is a method for sensing a perturbation using the sensor system of FIG. 2.

Referring now to FIG. 5, a method 500 can be used to operate the sensor system 200 to detect a perturbation of a parameter. In block 502, an electromagnetic wave is coupled to a measurement line 202. For example, an operator may couple laser light into a waveguide, tapered fiber, free-space mode, etc. Additionally or alternatively, an operator may couple light at any suitable frequency, such as at microwave frequencies.

In block 504, the electromagnetic wave in the measurement line 202 is coupled to a first resonator 204. The electromagnetic wave may be coupled in any suitable manner, such as evanescent coupling from a waveguide, fiber, or prism, coupling through a partial beam-splitter, etc.

In block 506, the electromagnetic wave is reciprocally coupled to a second resonator 204 if a perturbation is present. In some embodiments, the electromagnetic wave may be coupled to a different mode of the same resonator. The perturbation may be due to, e.g., the presence of a biological molecule or nanoparticle, rotation or linear movement of some or all of the sensor system 200, the presence of a gravitational wave, etc.

In block 508, the mode of the second resonator 206 is non-reciprocally coupled to the mode of the first resonator 204. The non-reciprocal coupling from the second resonator 206 to the first resonator 204 may be based on any suitable type of non-reciprocal coupling, such as a chiral waveguide, a circulator, an isolator, an optomechanical system, a classical microwave circuit, or a superconducting microwave circuit, coupling to an edge state of a topological photonic system, use of dynamic modulation, etc.

In block 510, the output of the measurement line 202 is measured at the measurement device 208. In the illustrative embodiment, the measurement device 208 performs homodyne detection on the signal coming out of the measurement line 202. Additionally or alternatively, the measurement device 208 may measure the output of the measurement line 202 in a different manner, such as using heterodyne detection, photon counting, power measurement, etc.

In block 512, a determination is made by an operator or a computer of whether the perturbation is present based on the output of the measurement line 202. For example, in the illustrative embodiment, a homodyne measurement may be performed for a period of time long enough to distinguish the presence of a perturbation. The measurement may be done for a certain period time or may be done continuously, continually, or periodically. Additionally or alternatively, in some embodiments, the measurement may be done by measuring a shift in line resonance of the system of the first resonator 204 and the second resonator 206 based on the presence of a perturbation.

Figure 6:
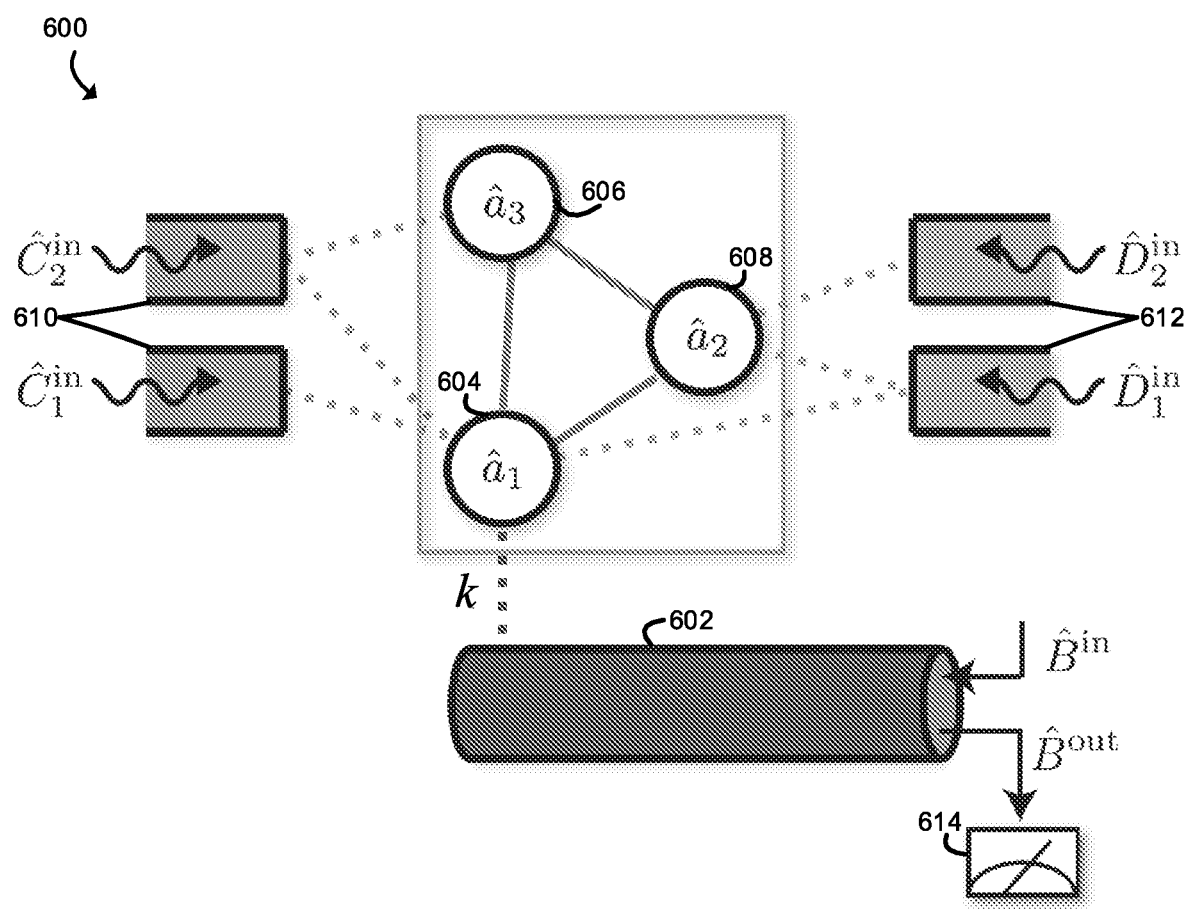
FIG. 6 is a simplified block diagram of at least one embodiment of a sensor system with multiple resonators, gain baths, and loss baths.

Referring now to FIG. 6, it should be appreciated that the techniques described herein can be applied to a more general system. For example, a sensor system 600 may include a measurement line 602 and two or more resonators, such as a first resonator 604, a second resonator 606, and a third resonator 608. The various resonators 604, 606, and 608 may be coupled to each other in any suitable reciprocal or non-reciprocal coupling. The resonators 602, 604, and 606 may also be coupled to one or more sources of incoherent gain (gain baths) 610 and/or one or more sources of loss (loss baths) 612. Although more than two resonators and gain baths 610 are not necessary to achieve an increased sensing in a non-reciprocal system, such a system 600 can still be used to achieve the increased sensing that is possible with non-reciprocal coupling.

What is claimed is:

1. A sensor system for sensing a perturbative coupling comprising:
a first resonator supporting a first electromagnetic mode;
a second resonator supporting a second electromagnetic mode, wherein the second electromagnetic mode is non-reciprocally coupled to the first electromagnetic mode such that the second electromagnetic mode can influence the first electromagnetic mode without a corresponding influence from the first electromagnetic mode on the second electromagnetic mode; and
a measurement line coupled to the first resonator for driving the first electromagnetic mode and providing a readout signal,
wherein the first resonator and the second resonator are configured such that the perturbative coupling causes reciprocal coupling between the first electromagnetic mode and the second electromagnetic mode,
wherein the readout signal is indicative of the whether the perturbative coupling is present.

2. The sensor system of claim 1, wherein there is no reciprocal coupling between the first electromagnetic mode and the second electromagnetic mode in the absence of the perturbative coupling.

3. The sensor system of claim 1, wherein the second electromagnetic mode is non-reciprocally transferred to the first electromagnetic mode at a rate J, wherein the magnitude of J is greater than $\sqrt{v_2^2+\gamma_2^2/4}$, where $v_2$ is a detuning of a frequency of the second electromagnetic mode relative to a frequency of the first electromagnetic mode and $\gamma_2$ is a rate of damping or anti-damping of the second electromagnetic mode.

4. The sensor system of claim 3, wherein the magnitude of J is at least ten times greater than $\sqrt{v_2^2+\gamma_2^2/4}$.

5. The sensor system of claim 1, wherein the readout signal is indicative of whether a perturbative coupling of strength ε is present in less time than $$\frac{k}{16\varepsilon^2\bar{n}},$$

wherein k is a coupling rate of the measurement line and the first resonator and $\bar{n}$ is the average number of photons in the first resonator.

6. The sensor system of claim 1, wherein the first resonator has a loss rate of $k+\gamma_1$ and the second resonator has a loss rate of $\gamma_2$, wherein k is a coupling rate of the measurement line and the first resonator, wherein $\gamma_2 < \frac{1}{4}\gamma_1$.

7. The sensor system of claim 1, wherein each of the first resonator and the second resonator is an optical cavity.

8. The sensor system of claim 7, wherein the first and second resonators are each coupled to a waveguide by a corresponding circulator, the first resonator being thereby coupled to the second resonator non-reciprocally.

9. The sensor system of claim 7, wherein the first and second resonators are each coupled to an edge state of a topological photonic system, the first resonator being thereby coupled to the second resonator non-reciprocally.

10. The sensor system of claim 7, wherein the first and second resonators are non-reciprocally coupled by methods using dynamic modulation.

11. The sensor system of claim 1, wherein each of the first and second resonators is a microwave cavity.

12. The sensor system of claim 1, wherein each of the first and second resonators is a resonant mode of a superconducting quantum circuit.

13. The sensor system of claim 1, further comprising a perturbative element causing the perturbative coupling, wherein the perturbative element is one or more biological molecules or one or more nanoparticles.

14. The sensor system of claim 1, wherein the perturbative coupling is present and wherein the perturbative coupling is caused by a gravitational wave, wherein the readout signal is indicative of whether the gravitational wave is present.

15. The sensor system of claim 1, wherein the perturbative coupling is present and wherein the perturbative coupling is caused by a rotation of at least one of the first resonator or the second resonator, wherein the readout signal is indicative of the rotation of the at least one of the first resonator or the second resonator.

16. The sensor system of claim 1, wherein the first resonator and the second resonator are not at an exceptional point.

17. The sensor system of claim 1, wherein the first resonator is not coupled to a source of incoherent gain.

18. A method for sensing a perturbative coupling, the method comprising:
    coupling an electromagnetic wave to a measurement line;
    coupling the electromagnetic wave to a first resonator, wherein the first resonator supports a first electromagnetic mode;
    if the perturbative coupling is present, coupling the electromagnetic wave to a second resonator, wherein the second resonator supports a second electromagnetic mode;
    non-reciprocally coupling the second electromagnetic mode to the first electromagnetic mode;
    measuring a readout signal of the measurement line; and
    determining whether the perturbative coupling is present based on the readout signal of the measurement line.

19. The method of claim 18, wherein the second electromagnetic mode is non-reciprocally coupled to the first electromagnetic mode at a rate J, wherein the magnitude of J is greater than $\sqrt{v_2^2+\gamma_2^2/4}$, where $v_2$ is a detuning of a frequency of the second electromagnetic mode relative to a frequency of the first electromagnetic mode and $\gamma_2$ is a rate of damping or anti-damping of the second electromagnetic mode.

20. The method of claim 18, wherein the readout signal is indicative of whether a perturbative coupling of strength $\epsilon$ is present in less time than $$\frac{k}{16\epsilon^2 \bar{n}},$$

wherein k is a coupling rate of the measurement line and the first resonator and $\bar{n}$ is the average number of photons in the first resonator.

* * * * *